United States Patent Office 3,457,800
Patented July 29, 1969

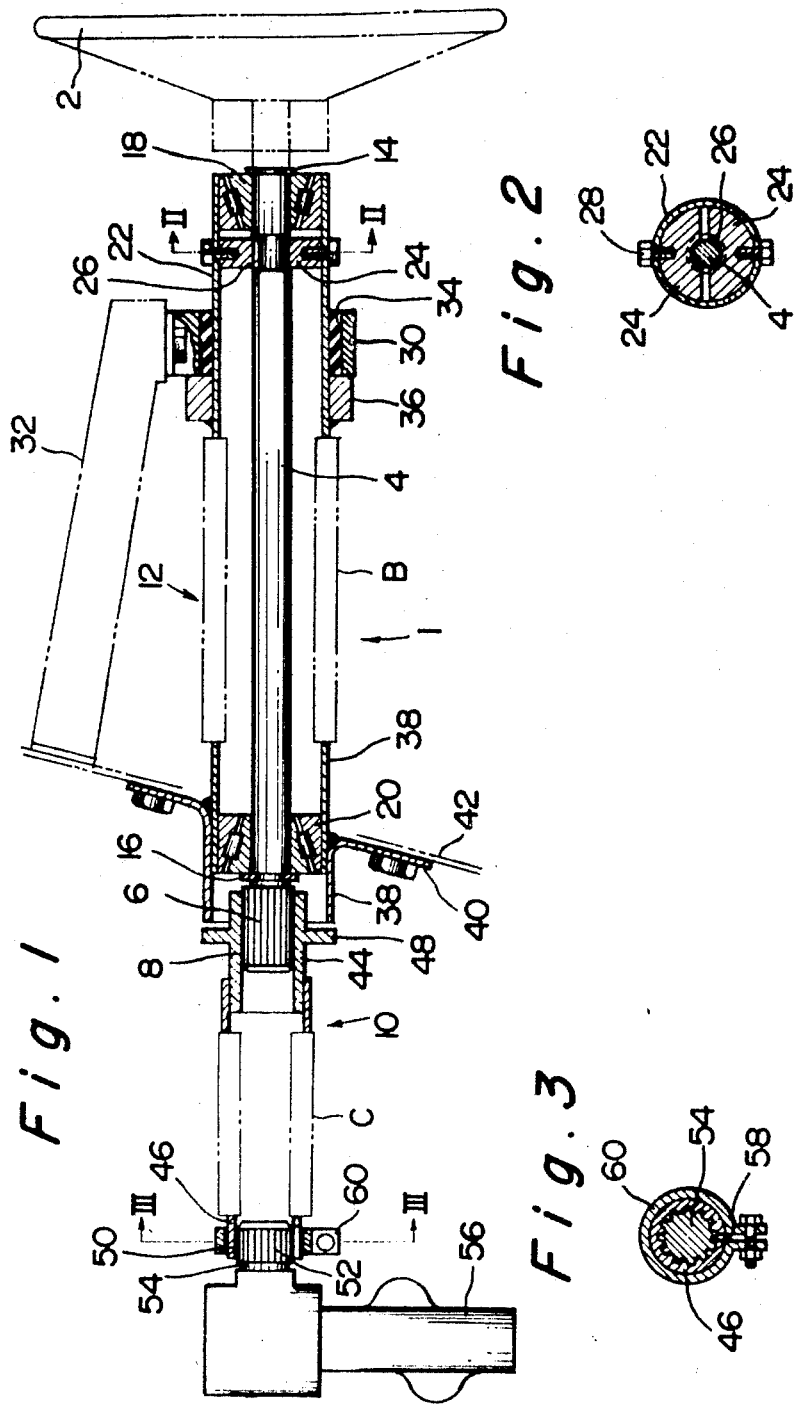

3,457,800
IMPACT ABSORBABLE STEERING ASSEMBLY
Shunichi Toshida and Hiroharu Suda, Tokyo, and Kazuo Suzuki, Yokohama-shi, Japan, assignors to Nissan Jidosha Kabushiki Kaisha, Kanagawa-ku, Yokohama, Japan
Filed Oct. 2, 1967, Ser. No. 672,164
Claims priority, application Japan, Dec. 2, 1966, (utility model) 41/109,730
Int. Cl. B62d 1/18; B60k 39/00
U.S. Cl. 74—492                                    6 Claims

ABSTRACT OF THE DISCLOSURE

A steering assembly for vehicle provides as a safety device, plastically deformable impact absorbing means serving only to absorb impact or axial force caused by human body in case of collision or the like, the steering assembly further provides means to transmit steering force to steering gear means transmitting rotational moment but not or scarcely transmitting axial force to cause almost free deformation in case of displacement of forward portion of the vehicle so as to prevent displacement of the steering wheel portion protecting the vehicle operator from possible injury.

Figure 4:
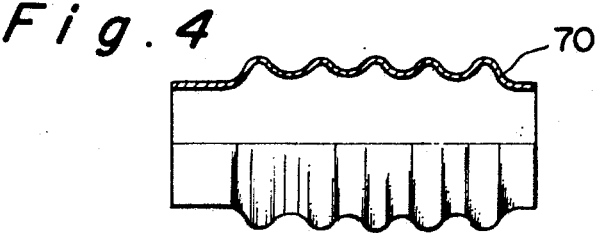

The present invention relates to a steering assembly and more particularly to a steering assembly enabling of absorbing impact imposed on human body in the event of an occurrence such as collision.

In the event of a vehicle impact with an obstacle, the vehicle providing conventional steering assembly might cause great danger to the vehicle operator by collision of the operator body to the steering column in the event of the occurrence causing substantial inertia force to the operator body and also by rearward displacement of the steering assembly if forward portions of the vehicle is destroyed.

Accordingly, it is a primary object of the invention to provide an improved steering assembly to eliminate or at least mitigate such disadvantage or danger.

In the event of a vehicle impact to an obstacle which would cause gear box displacement rearwardly relative to vehicle body or dash panel deformation by displacement of the engine, the axial force acting to the steering assembly to cause rearward or upward displacement of lower portion of the steering assembly will be far greater to be supported or absorbed. Accordingly, the impact or axial force will advisably be avoided to prevent from causing any effect or damage to the upper portion of the steering assembly also to the operator body.

Another object of the invention is to provide a steering assembly absorbing only the impact energy caused by operator's body, while eliminating to effect to the upper portion of the steering assembly if forward portions of the vehicle are deformed.

A further object of the invention is to provide a steering assembly of the type described including simple and reliable impact absorbing means absorbing impact energy by plastic deformation thereof.

Still another object of the invention is to provide a steering assembly of the type described including a flexible member transmitting rotational moment but not or scarcely transmitting axial force so as to protect upper portion of the steering assembly. The steering assembly is preferable to utilize as a steering assembly providing a long lower steering column shaft for a vehicle such as having a steering gear box in front of front wheel axis.

According to the present invention, the foregoing objects are attained by a steering assembly comprising in combination, an upper and a lower steering column shaft being engaged to each other, a jacket tube rotatably supporting the upper steering column shaft, said jacket tube being supported by an upper clamp member which is integral to vehicle body so as to be slidable only to lower direction, plastically deformable impact absorbing means being connected between said jacket tube and a portion secured to the vehicle body and said lower steering column shaft including a flexible member transmitting rotational moment only, so that impact energy caused by human body is absorbed while eliminating any effect to cause deformation of the upper portion of the steering assembly.

The steering assembly according to the invention enables to absorb impact energy in the event of an occurrence causing the vehicle operator to be thrown forwardly against the steering wheel, by plastic deformation of the impact absorbing means without any harmful reactional effect, while the lower steering column shaft including the flexible member transmitting rotational moment and not or scarcely transmitting axial force by temporary or permanent deformation of the member, will not transmit any harmful effect to the steering wheel portion in the event of vehicle impact to an obstacle which would cause the gear box to be displaced rearward relative to the other portion of the vehicle.

Figure 5:
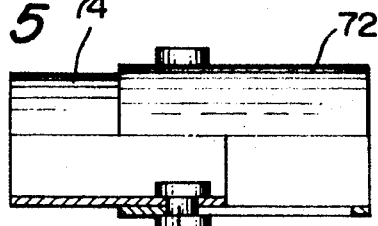
Figure 6:
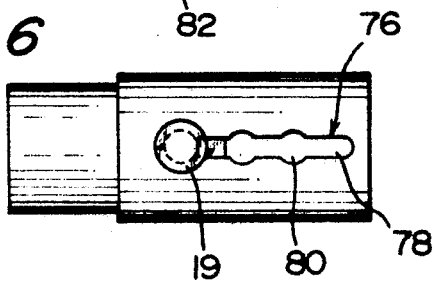
Figure 7:
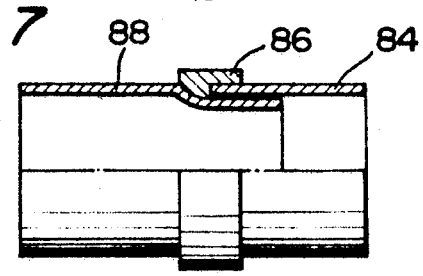
Figure 8:
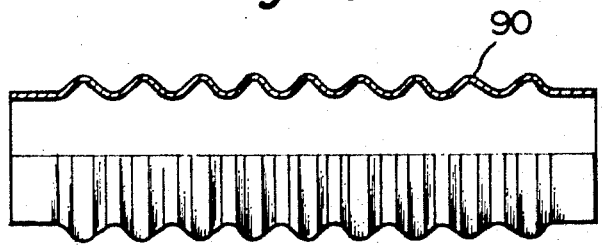
Figure 9:
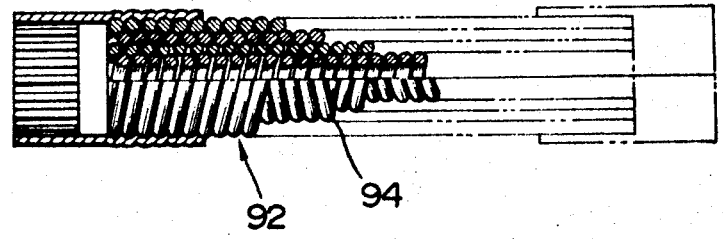

Further and more specific objects, features and advantages of the invention and the manner in which the invention is carried into practice are made apparent in the following detailed description wherein reference is made to the accompanying drawings, in which:

FIG. 1 shows diagrammatically a longitudinal sectional view of one embodiment of the steering assembly according to the invention, FIG. 2 shows a sectional view taken along the line II—II of FIG. 1, FIG. 3 shows a sectional view taken along the line III—III of FIG. 1, FIG. 4 shows a partially sectioned longitudinal view of one embodiment of plastically deformable impact absorbing means which is preferable to utilize for the apparatus shown in FIG. 1, FIG. 5 shows a partially sectioned longitudinal view of a second embodiment of the impact absorbing means, FIG. 6 shows a plan view of the impact absorbing means shown in FIG. 4, FIG. 7 shows a partially sectioned longitudinal view of a third embodiment of the impact absorbing means, FIG. 8 shows a partially sectioned longitudinal view of a flexible member which is preferable to utilize for the lower steering column shaft of the steering assembly shown in FIG. 1, and FIG. 9 shows a partially sectioned longitudinal view of a second embodiment of the flexible member.

Referring to the drawings and more particularly to FIGS. 1 through 3, 1 generally designates a steering assembly providing a steering wheel 2 secured to an upper steering column shaft 4 having a serrated portion 6 to its lower end slidably engaging to an inside serrated portion 8 of an upper end of a lower steering column shaft which is generally designated 10, according to a feature of the present invention.

The upper steering column shaft 4 is rotatably mounted in a jacket tube assembly 12 through retainer rings 14 and 16 and bearings 18 and 20, the lower bearing 20 permits downward or leftward displacement of the upper steering column shaft 4. The upper steering column shaft 4 is rotatably secured to an upper jacket tube 22 through half rings 24 engaged to a recess 26 formed to the shaft 4. The rings 24 are secured to the upper jacket tube 22 by suitable means such as screws 28 as shown in FIG. 2.

The upper jacket tube 22 is supported and guided by an upper clamp member 30 which is secured to a steering bracket 32 secured to a relatively rigid portion of the vehicle. The upper clamp member 30 may include suitable bearing means 34 such as rubber or suitable plastics having low frictional coefficient so as to ensure axial leftward displacement of the upper jacket tube 22 having integrally secured stopper or shoulder 36 abutting to the lower end of the upper clamp member 30 so that the upper jacket tube 22 and also the steering wheel 2 displace or slide relative to the clamp member only to leftward or downward direction by predetermined axial force as will be described more fully hereafter.

The jacket tube assembly 12 provides to its lower end a lower jacket tube 38 receiving the lower bearing 20 to support the lower end of the upper steering column shaft 4 and having a flange 40 secured to a dash panel portion 42 of the vehicle body. A plastically deformable impact absorbing member B such as shown in FIGS. 4 through 7 is secured between the upper jacket tube 22 and the lower jacket tube 38 to ensure proper impact absorption by plastic deformation of the member B, according to the invention, if the operator's body is thrown forwardly to the steering wheel 2 in the event of an occurrence such as collision.

The lower steering column shaft 10 includes an upper portion 44, a lower portion 46, and a flexible member C. The upper portion 44 provided the inside serrated portion 8 slidably engaging to the upper steering column shaft 4 and also on outside flange 48 abutting to the lower end of the lower jacket tube 38. The lower portion 46 of the lower steering column shaft 10 provides an inside serrated portion 50 to be engaged by an outside serrated portion 52 of a gear shaft 54 mounted in a steering gear box 56 which is secured to a portion of the vehicle (not shown) following conventional practice. The lower portion 46 having a slot 58 is secured to the gear shaft 54 by a clamp member 60 as shown in FIG. 3. The flexible member C as shown in FIGS. 8 and 9 inserted between the upper and lower portions 44 and 46 transmits rotational moment without transmitting substantial bending or compressive forces.

FIGS. 4 through 7 show some embodiments of plastically deformable impact absorbing means, which is suitable to use as the impact absorbing member B shown in FIG. 1. An impact absorbing member 70 shown in FIG. 4 comprising a bellows tube or a plain corrugated tube will be easily plastically deformed by predetermined axial force absorbing applied impact energy.

FIGS. 5 and 6 show another embodiment of impact absorbing means comprising an outer tubular member 72 and an inner tubular member 74 engaged in the outer member 72. The outer tubular member 72 provides a plurality of slots 76 each forming at least one narrow portion 78 and at least one wider portion 80. A plurality of projections pins 82 corresponding to the slots protrude from the inner member 74 and are received in one of the wider portions 80 securing the outer and inner tubular members 72 and 74 to form impact absorbing means. The impact absorbing means will slide relative to each other by predetermined axial force widening or plastically deforming the narrow portion 78 by the pin 82 thus absorb the applied impact energy.

FIG. 7 shows a third embodiment of impact absorbing means comprising an outer tubular member 84 providing a die 86 engaging to a reduced end of inner tubular member 88. The impact absorbing member will slide relative to each other by predetermined axial force squeezing or reducing the inner tubular member 88 by the die 86 so that the inner tubular member 88 deforms plastically and absorbs the applied impact energy.

FIGS. 8 and 9 show two embodiments of flexible means which are suitable to utilize as the flexible member C shown in FIG. 1 to transmit rotational moment of the steering force but not or scarcely transmit axial or bending force.

A flexible member shown in FIG. 8 comprises a bellows or corrugated tubular member 90 of thinner and more flexible sheet metal than the impact absorbing member 70 shown in FIG. 4. The flexible member 90 transmits rotational moment or steering force, however, the member 90 easily deforms permanently or temporary by an axial force so that the very little portions of the axial force is transmitted to the other end of the member.

FIG. 9 shows another embodiment of flexible means comprising a flexible member 92 which may be so socalled flexible shaft consisting of some layers of wound wires 94. The flexible member 92 transmits rotational moment, however, any axial force does not practically transmitted by flexing of the member 92.

Operations of the steering assembly according to the present invention will now be explained more detail. The steering assembly 1 controls vehicle in the same manner as conventional steering assembly in ordinary operation. The steering force in transmitted from the steering wheel 2 through the upper steering column shaft 4, the serrated engagements 6 and 8, lower steering column shaft 10 including the flexible member C, the serrated engagement 50 and 52, to the gear shaft 54 of the steering gear means. The flexible member C transmits the steering force and includes advantages that eliminating any misalignments between the upper and the lower portions 44 and 46 of the lower steering column shaft 10 and also absorbing any vibration transmitted to the steering gear box 56 or the steering gear shaft 54 from the forward portion of the vehicle.

In the event of an occurrence such as collision or like that, if the operator body is thrown forwardly, by socalled secondary collision induced by the primary collision of the vehicle body portion, the impact energy is applied to the steering wheel 2 through hands or body portion of the operator, causing leftward displacement of the upper portion of the steering assembly 1, i.e. the upper steering column shaft 4 and the upper jacket tube 22 which are secured to the steering wheel 2. The displacement of the upper steering column shaft 4 causes axial relative sliding between the inside serrated portion 6 and the outside serrated portion 8 of the lower steering column shaft 10 causing no reactional force or resistance to the upper steering column shaft 4, while the lower bearing 20 inserted in the lower jacket tube 38 permits leftward displacement of the steering column shaft 4. When the engagement between the serrated portions 6 and 8 is rather tight, the axial force is applied to the flexible member C through the upper portion 44 of the rear steering column shaft 10, the flexible member C will deform easily without or scarcely any resistance.

The upper jacket tube 22 which is axially secured to the upper steering column shaft 4 through the recess 26 and the half rings 24 will be displaced axially relative to the upper clamp member 30 which is secured to the vehicle body through the bracket 32, by favor of the bearing means 34 such as rubber or plastics having low frictional coefficient. As the lower jacket tube 38 is secured to the vehicle body portion, the applied axial force is transmitted to the impact absorbing member B, consequently the member B will be plastically deformed absorbing the applied energy without any harmful reactional effect so that the operator will be prevented from or at least mitigate damage or injury.

In the event of an occurrence if forward portion of the vehicle is destroyed, the so-called primary collision might cause the steering gear box 56 to displace rightward shown in FIG. 1, the lower portion 46 of the lower steering column 10 which is secured to the gear box 56 will also be displaced. The flexible member C of the lower steering column 10 will easily deformed or flexed permanently or temporary, transmitting very little fraction of the axial force to the upper portion 44 of the lower steering column 10 which force will be easily received by the shoulder portion 48 abutting to the lower end of the lower jacket tube 38, so that no displacement or harmful effect is transmitted to upper portion of the steering assembly.

When the impact absorbing means B is made of the bellows tube 70 shown in FIG. 4, the tube 70 will be collapsed permanently absorbing the applied impact energy without any harmful reaction. When the impact absorbing means B is formed by the slot type impact absorbing means as shown in FIGS. 5 and 6, the impact energy will act to the projections 82 secured to the inner tubular member 74 so that the projections will displace inwardly widening the narrow portions 78 of the slots 76. Thus the slots 76 will be permanently deformed absorbing the applied impact energy. Also, when the impact absorbing means B is formed by the impact absorbing means as shown in FIG. 7, the impact energy is applied to the die 86 through the outer tube 84, so that the die 86 squeezes or reduces the inner tubular member 88. Thus the diameter of the tubular member 88 will be permanently reduced absorbing the applied impact energy.

When the flexible tube C of the lower steering column shaft 10 is formed by the flexible member 90 as shown in FIG. 8, axial displacement of the lower portion 46 of the lower steering column shaft 10 in the event of an occurrence causing the steering gear box 56 to displace rearwardly, will cause permanent collapse or deformation of the flexible member 70. As the member 70 is made of easily deformable sheet metal, very little fraction of the axial energy is transmitted to the upper portion 44 of the lower steering column shaft 10, which fraction can be easily received by the shoulder portion 48 abutting to the lower end of the jacket tube 12. When the flexible tube C is formed by the flexible shaft 92 as shown in FIG. 9, any axial inner displacement between upper and lower portions 44 and 46 will be readily performed causing flexing of the flexible tube 92 without transmitting axial energy to the opposite end. Consequently, axial impact energy caused by displacement of the gear box will not be transmitted to the upper portion of the steering assembly.

In the event of an occurrence causing dash panel displacement in case of collision or like that, the dash panel 42 and the lower jacket tube 38 secured to the dash panel by the flange portion 40 will displace upward or rightward of FIG. 1. The axial energy or impact will cause deformation or collapse of the impact absorbing means B which is secured to the upper jacket tube 22 having the shoulder portion 36 receiving the axial force transmitted by the impact absorbing means B, consequently no harmful effect is transmitted to the upper portion of the steering assembly 1. The deformation of the impact absorbing means B in this case resembles as above described deformation caused by the operator's body, however, the impact energy caused by such as displacement of the engine body will be far greater than the impact energy caused by human body. Thus, the impact absorbing means B will not act as an effective impact absorber to the rightward displacement and act only as a safety device to prevent from the impact energy to cause damage to the upper portion of the steering assembly 1, so that the operator will be protected from damage or injury.

As described in detail, the steering assembly according to the present invention, eliminates or at least mitigates damage or injury to the vehicle operator, by simple and improved construction of the steering assembly, consequently, the present invention provides improved safety device for vehicles.

What we claim is:

1. An impact absorbable steering assembly comprising in combination, an upper steering column shaft, a lower steering column shaft engaged to the lower end of said upper steering column shaft, an upper jacket tube around the upper steering column shaft, an upper clamp member secured to the vehicle body slidably supporting the upper jacket tube, shoulder means provided on the outer surface of the upper jacket tube normally abutting the lower side surface of the upper clamp member, a lower jacket tube secured to a portion of the vehicle body, plastically deformable impact absorbing means positioned between said upper and lower jacket tubes, the upper and lower jacket tubes rotatably supporting the upper steering column shaft, and a flexible member in said lower steering column shaft to transmit rotational moment without transmitting substantial compressive forces, so that impact energy caused by a human body is absorbed by said impact absorbing means while eliminating any effect of causing deformation of the upper portion of the steering assembly by said flexible member and said impact absorbing means.

2. A steering assembly as defined in claim 1, wherein said impact absorbing means is a bellows tube.

3. A steering assembly as defined in claim 1, wherein said impact absorbing means consists of an outer tubular member providing a die to one end thereof and an inner tubular member having a reduced portion received in the die.

4. A steering assembly as defined in claim 1, wherein said flexible member consists of a bellows tube.

5. A steering assembly as defined in claim 1, wherein said flexible member consists of a flexible shaft means made of layers of wound wires.

6. An impact absorbable steering assembly comprising in combination, an upper steering column shaft, a lower steering column shaft engaged to the lower end of said upper steering column shaft, an upper jacket tube around the upper steering column shaft, an upper clamp member secured to the vehicle body slidably supporting the upper jacket tube, should means provided on the outer surface of the upper jacket tube normally abutting the lower side surface of the upper clamp member so as to allow the upper jacket tube to be slidable only in a lower direction, a lower jacket tube secured to a portion of the vehicle body, plastically deformable impact absorbing means positioned between said upper and lower jacket tubes, the upper and lower jacket tubes rotatably supporting the upper steering column shaft, and a flexible member in said lower steering column shaft to transmit rotational movement without substantial compression forces, wherein said impact absorbing means consists of an outer tubular member, an inner tubular member being engaged in the outer tubular member, said outer tubular member having at least one slot formed in the longitudinal direction, each said slot having at least one narrow portion and at least one wider portion, and incorporating at least one projection having corresponding width to engage said wider portion and being secured to said inner tubular member, so that impact energy caused by a human body is absorbed by said absorbing means while eliminating any effect of causing deformation of the upper portion of the steering assembly by said flexible member and said impact absorbing means.

References Cited

UNITED STATES PATENTS

| 2,949,753 | 8/1960 | Menoni | 64—15 |
| 3,144,918 | 8/1964 | Picton et al. | 188—1 |
| 3,167,974 | 2/1965 | Wilfert | 74—492 X |
| 3,262,332 | 7/1966 | Wight | 74—493 |
| 3,373,629 | 3/1968 | Wight et al. | 74—492 |

MILTON KAUFMAN, Primary Examiner

U.S. Cl. X.R.

180—78; 280—87